United States Patent [19]

Smith et al.

[11] Patent Number: 4,977,620

[45] Date of Patent: Dec. 11, 1990

[54] OPTICAL HOMODYNE DETECTION

[75] Inventors: David W. Smith; David Cotter, both of Woodbridge; Richard Wyatt, Martlesham Heath, all of England

[73] Assignee: British Telecommunications plc, Great Britain

[21] Appl. No.: 2,663

[22] PCT Filed: May 9, 1986

[86] PCT No.: PCT/GB86/00252

§ 371 Date: Jan. 5, 1987

§ 102(e) Date: Jan. 5, 1987

[87] PCT Pub. No.: WO86/06849

PCT Pub. Date: Nov. 20, 1986

[30] Foreign Application Priority Data

May 9, 1985 [GB] United Kingdom ............... 8511689
Oct. 7, 1985 [GB] United Kingdom ............... 8524688

[51] Int. Cl.$^5$ ............................................. H04B 10/06
[52] U.S. Cl. ................................. 455/619; 356/301; 356/349
[58] Field of Search ........................... 455/617, 619; 350/96.15, 96.16; 356/301, 349

[56] References Cited

U.S. PATENT DOCUMENTS 3,735,279  5/1973  Pedinoff.
4,107,628  8/1978  Hill et al. ...................... 350/96.3
4,401,364  8/1983  Mochizuki ................... 350/96.15
4,530,097  7/1985  Stokes et al. ....................... 372/6
4,561,119 12/1985  Epworth .......................... 455/609

FOREIGN PATENT DOCUMENTS 0144415 11/1981 Japan .............................. 455/617
59-61822  4/1984 Japan ........................... 350/96.15
0126696  7/1984 Japan .............................. 455/617

OTHER PUBLICATIONS

Desurvire et al.–"Raman Amplification"–Optics Letters–Feb. 1985, vol. 10, #2, pp. 83–85.
Uesugi et al.–"Maximum Single Frequency Input"–Electronics Letters–28 May 1981–vol. 17, #11, pp. 379,380.
"Stimulated Brillouin Scattering in Monomode Optical Fibre", Journal of Optical Communications, 4(1983), 1, 10–19, D. Cotter.
"R–5—Enhancement of Optical Receiver Sensitivities by Amplification of the Carrier", by Arnaud, IEEE J. of Q. Elec., vol. QE-4, No. 11, Nov. 1968, pp. 893–899.
Electronics Letters, vol. 19, No. 6, Mar. 1983, pp. 234–235, London, GB; A. L. Scholtz et al.: "Infra-Red Homodyne Receiver with Acousto-Optically Controlled Local Oscillator".

Primary Examiner—Joseph A. Orsino
Assistant Examiner—Leslie Van Beek
Attorney, Agent, or Firm—Nixon & Vanderhye

[57] ABSTRACT

An optical homodyne detection system employs the phenomenon of stimulated Brillouin scattering to amplify the carrier component of an incoming coherent modulated optical wave. The composite wave formed of the amplified carrier component and unamplified information component is locked in phase, frequency and polarization with the incoming modulated wave. Using this composite wave, a homodyne detection system is formed to detect the data in the information component.

12 Claims, 1 Drawing Sheet

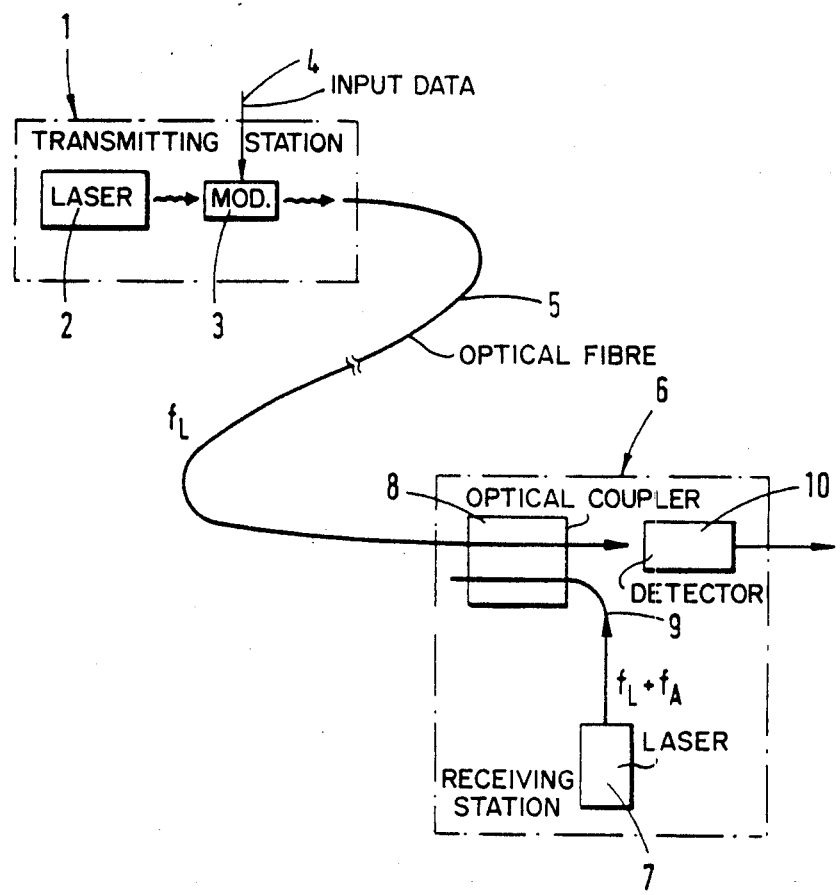

OPTICAL HOMODYNE DETECTION

BACKGROUND OF THE INVENTION

The invention relates to the homodyne detection of modulated optical signals. In homodyne detection, the carrier component of an optical wave which has been modulated in response to data is amplified prior to feeding the modulated wave to detection apparatus such as a photodiode. If an independent local oscillator such as a laser is used to provide the amplification power it is necessary to phase lock this to the incoming optical carrier. This requires that the local signal must have the same frequency as the carrier signal. Optical phase locking of two lasers using an optical analogue of the electronic phase lock loop has proved to be possible, but difficult.

SUMMARY OF THE INVENTION

In accordance with one aspect of the present invention, an optical homodyne detection system comprises a source of optical radiation; means for injecting radiation from the source in one direction into an optical waveguide in which, in use, a modulated optical wave having carrier and information components travels in the opposite direction, the characteristics of the radiation from the source and the form of the waveguide being such that scattering occurs whereby the carrier component of the modulated optical carrier wave is amplified; and demodulating means to which the optical wave with the amplified carrier component is fed.

In accordance with a second aspect of the present invention, an optical homodyne detection method comprises injecting optical radiation in one direction into an optical waveguide in which a modulated optical wave having carrier and information components travels in the opposite direction, the characteristics of the injected radiation and the form of the waveguide being such that scattering occurs whereby the carrier component of the modulated optical carrier wave is amplified; and demodulating the optical wave with the amplified carrier component.

Preferably, the characteristics of the injected radiation and the form of the waveguide are such that stimulated Brillouin scattering occurs.

Stimulated Brillouin scattering (SBS) has until now been considered a limitation on the transmission of radiation through waveguides. It is particularly apparent in the transmission of optical wavelengths through dielectric waveguides and occurs in low loss optical fibres if narrow linewidth laser light of above a certain power level threshold is injected.

The principle of SBS will now be described in connection with optical radiation. SBS can be described essentially as a coupled three-wave interaction involving the incident light wave (pump), a generated acoustic wave, and the scattered light wave (Stokes). The pump creates a pressure wave in the medium due to electrostriction and the resultant variation in density changes the optical susceptibility. Thus the incident light wave pumps the acoustic wave which scatters it and the scattering creates the Stokes wave.

The three waves obey the energy conservation law which relates the three frequencies by:

$$f_A = f_L - f_S$$

where the subscripts L, S, A refer to the laser (pump), Stokes and acoustic frequencies respectively. Maximum power transfer occurs when the wave-vector mismatch is zero:

$$k_A = k_L - k_S$$

There are two important consequences of these two equations. Firstly, the Stokes wave experiences maximum gain when the pump and Stokes wave vectors are parallel and counter-directional. Thus in a monomode fibre SBS generates a backward-travelling Stokes wave. Secondly, the Stokes wave is shifted to a lower frequency with respect to the pump by an amount equal to the acoustic frequency.

In homodyne detection a local oscillator must be locked in frequency, phase and polarisation to the carrier component of the incoming signal. This is achieved very simply with the invention since the SBS process results in a narrow linewidth wave travelling in the opposite direction to the injected light i.e. in the same direction as the incoming optical wave and with the same polarisation. Effectively, therefore, providing the injected radiation has the correct frequency, the carrier component of the incoming optical wave will be amplified.

Furthermore, accurate tuning of the local oscillator is not required. Typically this only needs to be tuned to an accuracy of the order of 1 MHz, the SBS process generating the correct returning wave.

As has been explained above, the scattered wave will have a frequency offset from the injected wave and this offset is independent of ambient conditions and depends essentially on the medium defining the optical waveguide and in particular its refractive index, the acoustic velocity in the medium and the wavelength of the injected radiation. In the case of fused silica in which the acoustic velocity is 5960 m/s, refractive index = 1.44 and the wavelength of the injected light is 1.55 μm, the frequency offset will be 11.1 GHz.

The demodulation means can comprise a direct detection optical receiver.

The detection system may be tuned by controlling the frequency of radiation from the local source with offset control means being provided to offset the radiation frequency by the required amount, for example 11 GHz. A suitable offset control means would be an AFC circuit.

BRIEF DESCRIPTION OF THE DRAWING

The FIGURE shows one embodiment of an optical homodyne detection system.

DESCRIPTION OF THE PREFERRED EMBODIMENTS

The source of optical radiation could be an external cavity diode laser or possibly a distributed feedback (DFB) laser.

The means for injecting radiation may comprise a semi-silvered mirror but preferably comprises a directional optical coupler whereby radiation from the source may pass along a first path to the coupler for injection into the optical waveguide, radiation in the optical waveguide being prevented by the coupler from passing in an opposite direction along the first path.

Although the invention is primarily concerned with the detection of ASK signals it may also be possible to detect PSK signals if it can be arranged that a small pilot carrier is provided at the transmitter. Preferably, this is in phase with the incoming signal but if not will simply result in a residual pilot carrier in quadrature with the signal sidebands; the amplified signal in this case can be corrected by detuning the pump laser away from the centre of SBS resonance.

We believe that a homodyne detection system based on the invention could be less demanding to develop than a heterodyne receiver and yet offer the higher performance of homodyne detection both in terms of receiver sensitivity and Gbit capability.

In this specification, the term optical is intended to refer to that part of the electro-magnetic spectrum which is generally known as the visible region together with those parts of the infra-red and ultra-violet region at each end of the visible region which are capable of being transmitted by dielectric optical waveguides such as optical fibres. Typically the radiation has a wavelength in the range of 0.5 $\mu m$–10 $\mu m$.

An example of part of a communications network including an optical homodyne detection system according to the invention will now be described with reference to the accompanying drawing which is a schematic block diagram.

The drawing illustrates a single transmitter and receiver but it should be understood that these may form part of a much larger network and are not necessarily directly connected together. A transmitting station 1 comprises a transmission laser 2 for generating a narrow linewidth optical signal which is fed to an optical modulator 3. The optical modulator is controlled via a data input 4 to amplitude modulate the incoming signal. The resultant modulated optical wave having a carrier component with a frequency $f_L$ is fed along a monomode optical fibre 5 (possibly via switching circuits not shown) to a receiving station 6.

The receiving station 6 comprises a local oscillator pump laser 7 which generates a narrow linewidth optical signal, having a frequency offset by a relatively small amount $f_A$ from the carrier component frequency $f_L$, which is fed to a directional coupler 8. The directional coupler 8 is also connected to the optical fibre 5 so that the optical wave from the laser 7 is coupled with the optical fibre 5 in a direction opposite to that of the optical wave from the transmitting station 1. The directional coupler 8 is such that a wave travelling along the optical fibre 5 to the receiving station 6 is not coupled with an optical fibre 9 connecting the coupler with the laser 7.

The frequency and power of the optical wave injected into the optical fibre 5 from the laser 7 is chosen so that stimulated Brillouin scattering takes place in the optical fibre 5. Power levels of the order of 500 $\mu W$–several mW are possible. In particular, significant Brillouin gain can, for example, be achieved at power levels of the order of milliwatts for fibre length of $>10$ km in the wavelength region of 1.5 micrometers. In view of the choice of frequency for the injected wave, the scattered wave will have the same frequency as the carrier component of the incoming wave. Essentially, this means that the carrier component is amplified. It should also be noted that the scattered wave will automatically lock in phase, frequency and polarisation with the carrier component.

The incoming wave with the amplified carrier component is then fed to a direct detection element 10 such as a photodiode which provides an electrical output corresponding to the original data.

In some cases the optical fibre 5 may be too short to enable SBS to occur. In that event additional optical fibre may be inserted.

In a practical experiment, a HeNe laser operating at a wavelength of 1.52 $\mu m$ was employed as transmitter laser 1. At the receiver the optical output of a Burleigh KCl:Tl colour laser 7 was coupled back into 30 km of optical fibre 5 via a fused fibre coupler 8. Using a dither control technique, the laser 7 was locked to a frequency 11 GHz greater than the carrier transmitted from the laser 1. The composite signal, containing the amplified carrier and modulation sidebands was then detected on a transimpedance PIN-FET receiver 10.

Practical measurements have shown amplification of the carrier by up to 40 dB. The principle of homodyne detection was then demonstrated by modulating the transmitter with a 125 MHz sine wave and measuring the signal photo current from the receiver with and without the pump. With approximately 5 mW of pump power the detected 125 MHz signal was increased by 25 dB.

It should be noted that detuning the pump laser will reduce the available gain and, more significantly, produce a phase shift in the amplified carrier; it is calculated that a frequency change of 370 kHz will result in a phase shift of 0.1 rads. Consequently, frequency fluctuations of the pump are converted into carrier phase noise which in turn will degrade system performance.

We claim:

1. An optical homodyne detection system comprising:

a source of optical radiation;

means for injecting radiation from the source in one direction into an optical waveguide in which, in use, a modulated optical wave having carrier and information components travels in the opposite direction, the characteristics of the radiation from the source and the form of the waveguide being such that stimulated Brillouin scattering occurs and produces a scattered optical wave whereby the carrier component of the modulated optical wave is amplified, the information component being substantially unamplified; and demodulating means to which the optical wave with the amplified carrier component is fed.

2. A system according to claim 1 wherein the demodulating means comprises a direct detection optical receiver.

3. A system according to claim 1 or claim 2, further comprising offset control means for tuning the frequency of radiation from the source so as to maintain an offset between the injected radiation and the carrier component such that the scattered optical wave has substantially the same frequency as the carrier component.

4. A system according to any of the preceding claims, 1 or 2 wherein the source comprises a laser.

5. A system according to any of the preceding claims, 1 or 2 wherein the means for injecting radiation comprises a directional optical coupler whereby radiation from the source may pass along a first path to the coupler for injection into the optical waveguide, radiation in the optical waveguide being prevented by the coupler from passing in an opposite direction along the first path.

6. An optical homodyne detection method comprising:

injecting optical radiation in one direction into an optical waveguide in which a modulated optical wave having carrier and information components travels in the opposite direction, the characteristics of the injected radiation and the form of the waveguide being such that stimulated Brillouin scattering occurs whereby the carrier component of the modulated optical wave is amplified, the information component being substantially unamplified, and demodulating the optical wave with the amplified carrier component.

7. A homodyne optical demodulation and detection apparatus for receiving a coherent optical carrier wave optically modulated with information signals, said modulated wave having an information component residing in one or more sidebands displaced from the carrier in the optical frequency domain, said homodyne apparatus coherently demodulating and detecting said information component so as to produce electrical signals corresponding to said information signals, said homodyne apparatus comprising:

an optical signal source providing a narrow linewidth, coherent local optical pump signal at a first predetermined frequency greater than said carrier wave;

a waveguide optically connected to receive said local optical pump signal passing therethrough in a first direction and to produce stimulated Brillouin scattering therealong which generates a backward travelling Stokes wave at a second predetermined frequency substantially equal to the frequency of said carrier wave;

modulated signal input means for coupling said modulated optical wave into said waveguide in a direction parallel to said Stokes wave thereby causing the carrier frequency component of said modulated wave to be amplified while leaving the information component of said modulated wave substantially unamplified as said modulated wave passes along said waveguide; and a photoelectric detector optically coupled to receive amplified optical output from the waveguide and, in response, to produce said electrical signals.

8. A method for achieving homodyne optical demodulation and detection of a modulated coherent optical signal having carrier and information components, the information component having at least one modulation sideband offset from the carrier component in the frequency domain, said method comprising the steps of:

amplifying the coherent carrier component of said modulated signal using an optical signal scattering phenomenon, while leaving the information component of said modulated signal substantially unamplified, and optically coupling the modulated optical signal having amplified carrier component to a photoelectric transducer.

9. A method as in claim 8 wherein said amplifying step is achieved using narrow line-width stimulated Brillouin scattering in a waveguide excited by a local optical pump source having a frequency offset from said carrier signal frequency.

10. A method of achieving homodyne optical demodulation and detection using a homodyne demodulating element of the type which receives a local oscillator signal, said method comprising the following steps:

(a) generating an optical carrier signal at a certain frequency;

(b) modulating said optical carrier signal to provide a modulated coherent optical signal having at least one sideband which includes the data modulated onto the carrier signal;

(c) applying said modulated coherent optical signal to a first end of an optical transmission line, said transmission line having said first end and a further end;

(d) generating an optical injection signal at a frequency offset from said certain frequency;

(e) applying said optical injection signal to said transmission line further end;

(f) causing said modulated coherent optical signal applied to said transmission line to undergo stimulated Brillouin scattering within said transmission line in response to said applied injection signal so as to provide an amplified scattered wave at said transmission line further end, said amplified scattered wave and said optical signal at said transmission line further end having the same frequency responsive to said frequency offset; and (g) demodulating said modulated coherent optical signal at said transmission line further end, said demodulating step including the step of applying said amplified scattered wave to said homodyne demodulating element as said local oscillator signal.

11. A method as in claim 10 wherein:

said modulated coherent optical signal including said sideband has a certain bandwidth; and said causing step (f) includes the steps of amplifying, with said stimulated Brillouin scattering, a bandwidth substantially less than said modulated coherent optical signal certain bandwidth such that said optical signal but not said information bearing sideband is amplified.

12. A method as in claim 11 wherein said generating step (d) includes the step of controlling the frequency of said injection signal with respect to the frequency of said optical carrier signal so that the frequency of said carrier signal but not the frequencies of said sideband fall within said stimulated Brillouin scattering amplification bandwidth.

* * * * *